United States Patent
Cheong et al.

(10) Patent No.: US 10,893,325 B2
(45) Date of Patent: Jan. 12, 2021

(54) DISPLAY DEVICE AND CONTROL METHOD THEREFOR

(71) Applicant: SAMSUNG ELECTRONICS CO., LTD., Suwon-si (KR)

(72) Inventors: Jae-eun Cheong, Yangju-si (KR);
Won-pil Kim, Suwon-si (KR);
Dae-hyun Nam, Anyang-si (KR);
Min-kyung Yoon, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/346,434

(22) PCT Filed: Oct. 23, 2017

(86) PCT No.: PCT/KR2017/011731
§ 371 (c)(1),
(2) Date: Apr. 30, 2019

(87) PCT Pub. No.: WO2018/084482
PCT Pub. Date: May 11, 2018

(65) Prior Publication Data
US 2019/0246172 A1 Aug. 8, 2019

(30) Foreign Application Priority Data
Nov. 4, 2016 (KR) .................. 10-2016-0146733

(51) Int. Cl.
*H04N 21/442* (2011.01)
*H04N 21/443* (2011.01)
(Continued)

(52) U.S. Cl.
CPC ......... *H04N 21/44218* (2013.01); *G06F 1/32* (2013.01); *G06F 1/3231* (2013.01);
(Continued)

(58) Field of Classification Search
CPC .......... H04N 21/44218; H04N 21/442; H04N 21/4432; H04N 5/63; G06F 1/32;
(Continued)

(56) References Cited

U.S. PATENT DOCUMENTS 7,519,703 B1* 4/2009 Stuart ................... G06F 21/554
709/217
8,583,909 B2 11/2013 Cha et al.
(Continued)

FOREIGN PATENT DOCUMENTS

JP 2001-74854 A 3/2001
KR 2001-0089021 A 9/2001
(Continued)

OTHER PUBLICATIONS

International Search Report (PCT/ISA/210) dated Apr. 26, 2018 issued by the International Searching Authority in International Application No. PCT/KR2017/011731.
(Continued)

*Primary Examiner* — Brian P Yenke
(74) *Attorney, Agent, or Firm* — Sughrue Mion, PLLC

(57) ABSTRACT

A display device is provided. The display device according to an embodiment includes a display, a sensor configured to detect a distance between a user and the display device, a sub-processor configured to receive a detection signal from the sensor based on the user existing in a first area among a plurality of areas divided according to a distance from the display device, and a processor configured to, based on the sub-processor receiving the detection signal from the sensor in a state where the sensor and the sub-processor are activated, be activated by the sub-processor and update a content, and based on the user being determined to exist in a second area among the plurality of areas on a basis of a distance between the user and the display device, activate
(Continued)

the display in an inactivation state and display the updated content through the activated display.

9 Claims, 7 Drawing Sheets

(51) Int. Cl.
| | | |
|---|---|---|
| H04N 5/63 | (2006.01) | |
| G06F 1/3234 | (2019.01) | |
| G06F 1/32 | (2019.01) | |
| G06F 1/3287 | (2019.01) | |
| G06F 1/3231 | (2019.01) | |
| G06F 3/01 | (2006.01) | |

(52) U.S. Cl.
CPC .......... *G06F 1/3265* (2013.01); *G06F 1/3287* (2013.01); *G06F 3/01* (2013.01); *H04N 5/63* (2013.01); *H04N 21/442* (2013.01); *H04N 21/4432* (2013.01)

(58) Field of Classification Search
CPC .... G06F 1/3231; G06F 1/3265; G06F 1/3287; G06F 3/01
See application file for complete search history.

(56) References Cited

U.S. PATENT DOCUMENTS

| | | | | |
|---|---|---|---|---|
| 8,629,938 | B2* | 1/2014 | Wong | G06F 3/011 340/540 |
| 8,928,723 | B2* | 1/2015 | Kang | G06F 3/017 348/14.02 |
| 8,949,871 | B2* | 2/2015 | Chai | H04H 60/45 725/10 |
| 9,104,408 | B2* | 8/2015 | Oba | G06F 1/3203 |
| 9,113,190 | B2* | 8/2015 | Clavin | G06F 1/3231 |
| 9,137,570 | B2* | 9/2015 | Hatambeiki | H04N 21/44218 |
| 9,286,850 | B2* | 3/2016 | Mori | G09G 5/00 |
| 9,288,387 | B1* | 3/2016 | Keller | H04N 21/44218 |
| 9,318,143 | B2* | 4/2016 | Pai | G06F 1/3231 |
| 9,407,704 | B2* | 8/2016 | Yu | H04L 65/403 |
| 9,442,556 | B2 | 9/2016 | Joo et al. | |
| 9,569,815 | B1* | 2/2017 | Abuelsaad | G06T 3/40 |
| 9,571,781 | B2* | 2/2017 | Na | H04N 21/4223 |
| 9,625,973 | B2* | 4/2017 | Shiozaki | G06F 1/3265 |
| 9,800,927 | B2* | 10/2017 | Chai | H04H 60/45 |
| 9,911,398 | B1* | 3/2018 | McQueen | G09G 5/373 |
| 9,958,930 | B2 | 5/2018 | Joo et al. | |
| 10,200,725 | B2* | 2/2019 | Tatourian | H04N 21/234345 |
| 10,284,708 | B2* | 5/2019 | Alameh | H04M 1/72569 |
| 10,306,313 | B2* | 5/2019 | Choi | H04N 21/4432 |
| 10,429,983 | B2* | 10/2019 | Zhou | G06F 3/0414 |
| 10,453,371 | B2* | 10/2019 | Perdices-Gonzalez | G09G 3/2096 |
| 10,790,823 | B1* | 9/2020 | Keyzer | G06F 3/044 |
| 2003/0051182 | A1* | 3/2003 | Tsirkel | G06F 1/3203 713/320 |
| 2007/0033607 | A1 | 2/2007 | Bryan | |
| 2007/0109450 | A1* | 5/2007 | Lee | H04W 76/10 348/730 |
| 2008/0108308 | A1* | 5/2008 | Ullah | G06Q 30/02 455/41.2 |
| 2008/0109307 | A1* | 5/2008 | Ullah | G06Q 30/02 705/14.66 |
| 2008/0220760 | A1* | 9/2008 | Ullah | G06Q 30/02 455/420 |
| 2009/0298514 | A1* | 12/2009 | Ullah | G01S 5/02 455/456.5 |
| 2010/0066855 | A1* | 3/2010 | Suzuki | G06F 3/012 348/222.1 |
| 2010/0205669 | A1* | 8/2010 | Mantripragada | G06F 21/51 726/22 |
| 2011/0063207 | A1 | 3/2011 | Lee | |
| 2011/0080529 | A1* | 4/2011 | Wong | G06F 3/011 348/734 |
| 2011/0119640 | A1* | 5/2011 | Berkes | G06F 3/011 715/863 |
| 2011/0300911 | A1* | 12/2011 | Matsui | H04N 9/3173 455/566 |
| 2012/0026082 | A1* | 2/2012 | Mizukoshi | G09G 3/20 345/156 |
| 2012/0060176 | A1* | 3/2012 | Chai | H04H 60/45 725/10 |
| 2012/0092248 | A1* | 4/2012 | Prabhala | G09G 5/363 345/156 |
| 2013/0050197 | A1* | 2/2013 | Oosawa | H04N 13/302 345/419 |
| 2013/0194238 | A1* | 8/2013 | Sakai | H04N 21/4314 345/175 |
| 2013/0290867 | A1* | 10/2013 | Massand | G06F 3/04842 715/750 |
| 2014/0075230 | A1 | 3/2014 | Suggs et al. | |
| 2014/0078164 | A1* | 3/2014 | Chan | G09G 5/30 345/589 |
| 2014/0097934 | A1* | 4/2014 | Su | G08C 17/00 340/3.1 |
| 2014/0118240 | A1* | 5/2014 | Pais | G09G 3/00 345/156 |
| 2014/0118403 | A1* | 5/2014 | Verthein | H04N 7/15 345/660 |
| 2014/0152818 | A1 | 6/2014 | Na et al. | |
| 2014/0306973 | A1* | 10/2014 | Yang | G06T 1/20 345/522 |
| 2014/0354695 | A1* | 12/2014 | Sakai | H04N 21/4312 345/650 |
| 2015/0084861 | A1* | 3/2015 | Cheon | G06F 3/0482 345/156 |
| 2015/0370323 | A1* | 12/2015 | Cieplinski | G06F 3/013 345/156 |
| 2016/0029014 | A1* | 1/2016 | Kim | G06K 9/00335 345/214 |
| 2016/0037209 | A1* | 2/2016 | Miyoshi | H04N 21/43615 725/85 |
| 2016/0058366 | A1 | 3/2016 | Choi et al. | |
| 2016/0124537 | A1* | 5/2016 | Kim | H04N 21/4122 345/173 |
| 2016/0147278 | A1* | 5/2016 | Yoon | G06F 1/3265 713/323 |
| 2016/0150472 | A1* | 5/2016 | Yoon | G06F 1/3293 455/574 |
| 2016/0188973 | A1* | 6/2016 | Ziaja | G06F 21/84 382/116 |
| 2016/0195916 | A1 | 7/2016 | Shiozaki | |
| 2016/0366454 | A1* | 12/2016 | Tatourian | H04N 21/234345 |
| 2017/0048582 | A1* | 2/2017 | Zhang | H04N 21/44218 |
| 2017/0078618 | A1* | 3/2017 | Shibata | G06K 9/00771 |
| 2017/0083778 | A1* | 3/2017 | Lee | G06F 3/005 |
| 2017/0192486 | A1* | 7/2017 | Park | G06F 1/3231 |
| 2017/0270383 | A1* | 9/2017 | Onomura | G06T 7/74 |
| 2017/0289766 | A1* | 10/2017 | Scott | H04W 4/023 |
| 2018/0103230 | A1* | 4/2018 | Vitta | H04N 19/59 |
| 2018/0113593 | A1* | 4/2018 | Ng | G06F 3/04815 |
| 2018/0182359 | A1* | 6/2018 | Liu | G06F 9/54 |
| 2018/0270530 | A1* | 9/2018 | Ren | H04N 21/44218 |
| 2018/0288392 | A1* | 10/2018 | Hicks | G09G 5/00 |
| 2019/0087048 | A1* | 3/2019 | Zhou | G06F 3/0414 |
| 2019/0121458 | A1* | 4/2019 | Sakai | G06F 3/0481 |
| 2019/0121522 | A1* | 4/2019 | Davis | G06F 3/04815 |
| 2019/0130655 | A1* | 5/2019 | Gupta | G06T 19/20 |
| 2019/0172091 | A1* | 6/2019 | Pateel | G06F 16/24575 |

FOREIGN PATENT DOCUMENTS

| | | |
|---|---|---|
| KR | 10-2012-0113749 A | 10/2012 |
| KR | 10-2014-0050290 A | 4/2014 |
| KR | 10-2014-0072688 A | 6/2014 |
| KR | 10-1437448 B1 | 9/2014 |
| KR | 10-2014-0128766 A | 11/2014 |

(56) References Cited

FOREIGN PATENT DOCUMENTS

KR  10-2016-0024627 A  3/2016
KR  10-2016-0060968 A  5/2016

OTHER PUBLICATIONS

Written Opinion (PCT/ISA/237) dated Apr. 26, 2018 issued by the International Searching Authority in International Application No. PCT/KR2017/011731.
Communication dated Jun. 14, 2019 issued by the European Intellectual Property Office in counterpart European Application No. 17868107.8.

* cited by examiner

FIG. 3

| Case | OPERATION BLOCK | | | | |
|---|---|---|---|---|---|
| | SENSOR | SUB-PROCESSOR | STORAGE | PROCESSOR | DISPLAY |
| Cold Boot | X | O | X | X | X |
| RANGE EXCEEDING FIRST AREA | O | O | O | X | X |
| FIRST AREA | O | O | O | O | X |
| SECOND AREA | O | O | O | O | O |

DISPLAY DEVICE AND CONTROL METHOD THEREFOR

CROSS-REFERENCE TO RELATED APPLICATION

This application is based on and claims priority under 35 U.S.C. 119 to Korean Patent Application No. 10-2016-0146733, filed on Nov. 4, 2016 in the Korean Intellectual Property Office, the disclosure of which is herein incorporated by reference in its entirety.

BACKGROUND

Field

The disclosure relates to a display device and a controlling method thereof, and more specifically, to a display device which detects a distance from a user and a controlling method thereof.

Description of Related Art

Recently, with the development of electronic technology, various display devices such as a television (TV), a computer, a notebook, etc. have been developed and such display devices provide various contents for meeting the detailed requirements of consumers. For example, the display device such as a digital TV (DTV) can provide various broadcasting programs in a high quality screen and various broadcasting services by adding a data process function such as a computer.

However, as the display device provides various functions, there has been a problem that the booting time required to drive the display device has been extended.

Specifically, the display device in an off state starts a driving operation for driving a display panel from the time point when a turn on command is input by a user. However, for the display device to provide various functions, a plurality of systems in the display device should be driven and according thereto, the booting time until a normal TV screen is driven through the TV panel has been extended.

In order to resolve such a problem, recently, there is provided a display device for permitting power to a display when a user is detected within a predetermined distance from the display device.

However, with this device, a broadcasting program can be displayed even if a user does not intend to watch the broadcasting program, and an unintentional power consumption may occur according thereto.

Accordingly, there is a need for a display device for meeting needs of consumers by automatically displaying contents preferred by a user other than broadcasting contents, in addition to minimizing the booting time.

SUMMARY

The disclosure addresses the above-mentioned need, and an example aspect of the disclosure is to provide a display device capable of updating a content based on a distance between a user and a display device and displaying the updated content automatically, and a controlling method thereof.

According to an embodiment of the disclosure, there is provided a display device including a display, a sensor configured to detect a distance between a user and the display device, a sub-processor configured to receive a detection signal from the sensor based on the user existing in a first area among a plurality of areas divided according to a distance from the display device, and a processor configured to, based on the sub-processor receiving the detection signal from the sensor in a state where the sensor and the sub-processor are activated, be activated by the sub-processor and update a content, and based on the user being determined to exist in a second area among the plurality of areas on a basis of a distance between the user and the display device, activate the display in an inactivation state and display the updated content through the activated display.

The first area may be an area located relatively farther from the display device than the second area.

The processor may be configured to update the content to correspond to a current state at a time point when the user exists in the first area.

The processor may be configured to, based on the user being determined to exist in the first area, request a server to transmit a content corresponding to a current state, receive a content corresponding to a current state from the server, and update the content.

The processor may be configured to, based on a plurality of users existing in the first area, update a content corresponding to a user of a terminal device connected to the display device through a network from among the plurality of users.

The display device may further include a communicator, and the communicator is configured to be connected to an Internet of Things (IoT) device through a network, and the processor is configured to update the content based on a sensing signal being received from the IoT device.

The content may include at least one of information on weather, time, news, a personal schedule or a traffic condition.

According to an embodiment of the disclosure, there is provided a method for controlling a display device including detecting a distance between a user and the display device, updating a content based in the user existing in a first area among a plurality of areas divided according to a distance from the display device, displaying the updated content based on the user existing in a second area among the plurality of areas.

The first area may be an area located relatively farther from the display device than the second area.

The updating the content may comprise updating the content to correspond to a current state at a time point when the user exists in the first area.

The updating the content may comprise, based on the user being determined to exist in the first area, requesting a server to transmit a content corresponding to a current state, receiving a content corresponding to a current state from the server, and updating the content.

The updating the content may comprise, based on a plurality of users existing in the first area, updating a content corresponding to a user of a terminal device connected to the display device through a network from among the plurality of users.

The method may further include connecting to an IoT device through a network, and the updating the content comprising updating the content based on a sensing signal being received from the IoT device.

The content may be configured to include at least one of information on weather, time, news, a personal schedule or a traffic condition.

According to various embodiments of the disclosure described above, the display device for automatically displaying a content preferred by a user in a minimized booting time is provided which improves the user convenience.

BRIEF DESCRIPTION OF THE DRAWINGS

The above and/or other aspects, features and advantages of various example embodiments of the disclosure will be more apparent from the following detailed description, taken in conjunction with the accompanying drawings, in which:

FIG. 3 is a view illustrating a block operated in a display device based on a distance between a display device and a user according to an embodiment of the disclosure.

DETAILED DESCRIPTION

The terms used in the disclosure and the claims are general terms selected in consideration of the functions of the various example embodiments of the disclosure. However, such terms may be varied depending on an intention of those skilled in the art, a legal or technical interpretation, an emergence of a new technology, and the like. Also, there may be some terms arbitrarily selected by an applicant. Such terms may be construed according to meanings defined in the disclosure, and may also be construed based on general contents of the disclosure and a typical technical concept in the art unless the terms are not specifically defined.

In describing example embodiments, detailed description of relevant known functions or components may be omitted if it would obscure the description of the subject matter.

The embodiments are described in greater detail with reference to the accompanying drawings, but example embodiments are not limited thereto.

Hereinafter a display device according to the embodiments will be described with reference to the accompanying drawings.

Figure 1:
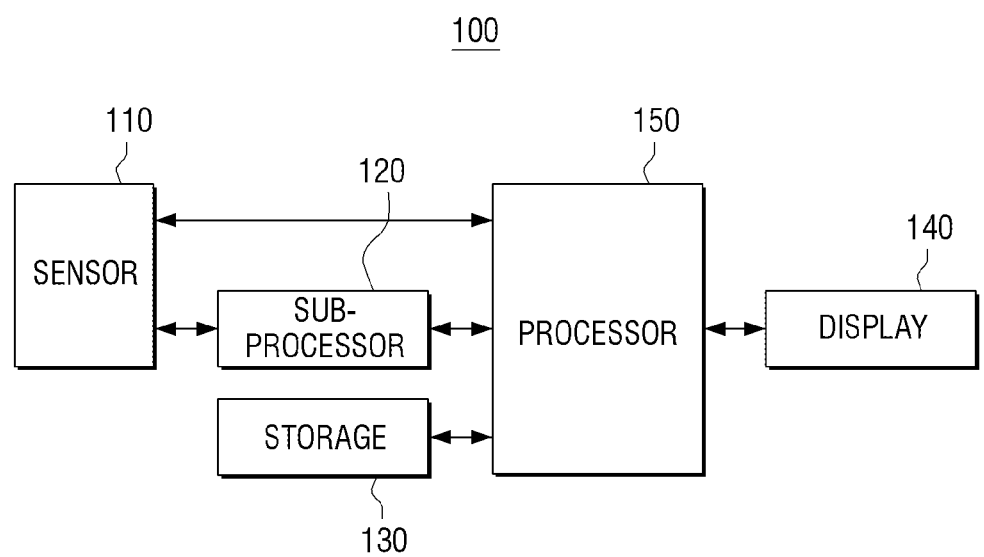
FIG. 1 is a block diagram illustrating a configuration of a display device according to an embodiment of the disclosure.

FIG. 1 is a block diagram illustrating a configuration of a display device according to an embodiment of the disclosure.

As illustrated in FIG. 1, the display device 100 according to an embodiment includes a sensor 110, a sub-processor 120, a storage 130, a display 140 and a processor 150. Here, the display device 100 may be implemented as various electronic devices such as a mobile phone, a tablet personal computer (PC), a digital camera, a camcorder, a notebook PC, a desktop, a personal digital assistant (PDA), MPEG-1 Layer3 (MP3), etc.

The sensor 110 may detect a distance between a user and the display device 100.

For this operation, the sensor 110 may include at least one sensor. Specifically, the sensor 110 may include a Pyroelectric Infrared Ray (PIR) sensor, a proximity sensor, an ultrasonic sensor, an illumination sensor, an acceleration sensor, etc.

Here, the PIR sensor may detect the distance between the user and the display device 100 by measuring infrared ray. Specifically, the PIR sensor is a sensor which uses a pyroelectric effect phenomenon in which ferroelectrics that absorb heat energy cause spontaneous polarization and thus, the charge corresponding to the amount of change of the polarization is maintained. That is, the PIR sensor may detect the infrared in specific wave length emitted by a human body and detect the distance between a user and the display device 100.

In addition, the proximity sensor may detect the distance between a user and the display device 100 using the strength of an electromagnetic field. For example, the proximity sensor may be implemented in various forms such as a high-frequency oscillation type, a capacitive type, a magnetic type, a photoelectric type, and an ultrasonic type depending on a detection principle and detect the distance between a user and the display device 100.

In addition, the ultrasonic sensor may output a signal to a forward direction of the display device 100 and detect the distance between a user and the display device 100 using the input signal reflected by a user and input.

Also, the illumination sensor measures the brightness of the space in which a user is located and if a change of illuminance is detected, the illumination sensor may detect the movement of the user, and the acceleration sensor may detect the movement of a user by measuring dynamic power such as an acceleration by the movement of the user.

Meanwhile, the sensor described above is merely an example embodiment, and the sensor 110 may detect the distance between a user and the display device 100 by further including various types of sensors such as a gyroscope sensor, a geo-magnetic sensor, an illumination sensor, and a radio-frequency (RF) sensor.

In FIG. 1, it has been illustrated that the sensor 110 is included in the display device 100, but according to another embodiment, the sensor 110 may be implemented as an external sensor separated from the display device 100. In this case, the display device 100 may receive a detection signal by communicating with the external sensor.

If it is detected that a user exists in the first area among the plurality of areas divided according to the distance from the display device 100, the sensor 110 may generate a detection signal and send the signal to the sub-processor 120. For example, the first area may be the area spaced apart from the display device 100 for a predetermined distance or more.

Here, the detection signal may be an interrupt signal. Specifically, the detection signal may be the interrupt signal that causes the sub-processor 120 to operate according to an interrupt routine. Here, the interrupt routine may be a set of commands which causes the sub-processor 120 to transmit a control signal that controls power provided to the processor 150, to the processor 150.

The plurality of areas divided according to the distance from the display device 100 may be set by a user. This will be described in detail later.

The sub-processor 120 may control the power provided to the processor 150 when a detection signal is received from the sensor 110. Specifically, the sub-processor 120 may transmit the control signal which applies power to the processor 150 based on the interrupt process routine described above and activate the processor 150.

In more detail, if the detection signal is received from the sensor 110 in a state where the power of the processor 150 is turned off, the sub-processor 120 may control to apply power to the processor 150, transmit a booting signal to the processor 150 and activate the processor 150.

For this operation, the sub-processor 120 may maintain the activated state together with the sensor 110 even if the processor 150 and the display 140 are not activated. Specifically, even when the processor 150 and the display 140 are not activated because driving power is not provided, the sensor 110 may maintain the activated state for continuously detecting the distance between a user and the display device 100, and the sub processor 120 may receive the detection signal from the sensor 110 and continuously maintain the activated state for activating the processor 150 when the detection signal is received.

For this operation, the sub-processor 120 may include a central processing unit (CPU), a random access memory (RAM), and a read only memory (ROM) and perform calculation regarding controlling or data processing of the sensor 110. For example, the sub-processor 120 may be implemented as a micro controller unit (MCU).

The storage 130 may store various contents. Here, the contents may include various contents such as weather, time, news, a personal schedule, a traffic condition and the like, and an application including the various contents.

In addition, the storage 130 may store contents to correspond to each of a plurality of users. Here, in order to map each content to a user and store the content, each content may be linked to mobile terminal apparatus information of each user (e.g., an internet protocol (IP) address or a media access control (MAC) address of a mobile terminal apparatus which has been linked with the display device 100 in a wireless communication manner) and stored.

However, if the display device 100 obtains user information, it is also possible that the content corresponding to a user is automatically selected and stored based on the user information. For example, the content corresponding to a user may be received from an external server based on the gender, age, etc. of the user, and the content may be mapped to each user and stored.

Meanwhile, the storage 130 may be implemented as various types of storing medium. For example, the storage 130 may be implemented as a non-volatile memory element such as ROM, programmable ROM (PROM), erasable programmable ROM (EPROM), and flash memory, a volatile memory element such as RAM, or a storage device such as hard disk or optical disk.

The display 140 may provide various contents screens. Here, the contents screen may be various contents such as weather, time, news, a personal schedule, a traffic condition and the like in addition to a broadcasting content screen.

Meanwhile, the display 140 may be implemented as various types of displays such as a liquid crystal display (LCD) panel, organic light emitting diodes (OLED), a liquid crystal on silicon (LCoS), a digital light processing (DLP), and the like. In addition, the display 140 may include a driving circuit, a backlight unit, and the like which may be implemented in forms such as an a-si TFT, low temperature poly silicon (LTPS) TFT, organic TFT (OTFT), and the like.

The processor 150 controls overall operations of the display apparatus 100.

For this operation, the processor 150 may include a central processing unit (CPU), a random access memory (RAM), and a read only memory (ROM) and perform calculation regarding controlling or data processing of other elements included in the display device 100. For example, the processor 150 may be implemented by a System on Chip (SoC).

First, if the sub-processor 120 receives a detection signal from the sensor 110 in a state where the sensor 110 and the sub-processor 120 are activated, the processor 150 may be activated by the sub-processor 120.

Specifically, in a state where the sensor 110 and the sub-processor 120 are activated and the processor 150 and the display 140 are inactivated, for example, in an off state, if the detection signal is received from the sensor 110, the sub-processor 120 may control the power applied to the processor 150, that is, apply the power to the processor 150, to activate the processor 150.

In addition, the activated processor 150 may perform different operations according to the location where a user exists, from among a plurality of areas divided based on the distance from the display device 100.

Specifically, referring to FIG. 2, the operation of the processor 150 according to the distance between a user and a display device will be described in detail.

Figure 2:
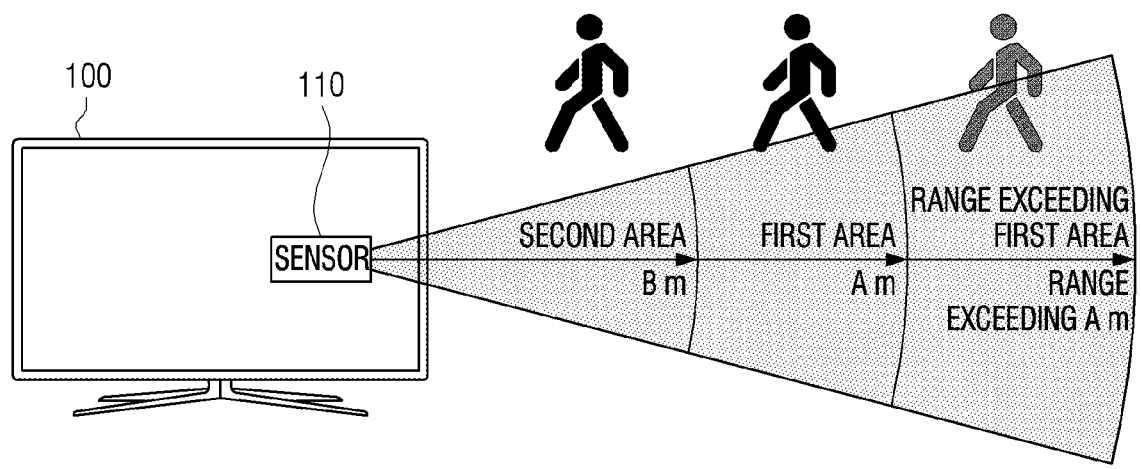
FIG. 2 is a view illustrating an operation of a display device according to a distance between a display device and a user according to an embodiment of the disclosure.

FIG. 2 is a view illustrating an operation of a display device according to a distance between a display device and a user according to an embodiment of the disclosure.

First, the processor 150 may receive information on the distance between a user and the display device 100 from the sensor 110. Specifically, if the processor 150 is activated by the sub-processor 120, the processor 150 may receive information on the distance between a user and the display device 100 from the sensor 110.

In addition, the processor 150 may determine the area where a user exists among the plurality of areas divided based on the distance from the display device 100 based on the distance information received from the sensor 110.

Here, the plurality of areas may be predetermined by a user. For example, the user may set the first area and the second area, and the first area may be the area located relatively farther from the display device 100 than the second area.

For example, referring to FIG. 2, the plurality of areas may include the first area which is the range equal to or less than A(m) and exceeding B(m) based on the display device 100, the second area which is the range equal to or less than B(m) based on the display device 100, and the range exceeding the first area which is the range exceeding A(m) based on the display device 100. Hereinafter for convenience of description, an embodiment will be described by assuming that the plurality of areas are divided as illustrated in FIG. 2.

Meanwhile, the processor 150 may receive the information on the distance between the user and the display device 100 only when the user is detected within the first area. This is because that as described above, only when the user is detected in the first area, the sensor 110 generates and transmits a detection signal to the sub-processor 120 and according thereto, the processor 150 may be activated. That is, while a user exists in the range exceeding the first area, the processor 150 maintains an activation state (or an off state).

If it is determined that the user exists in the first range, the processor 150 may update a content. Here, the content may be various contents such as weather, time, news, a personal schedule, a traffic condition, etc. stored in the storage 130 by the user. However, it is not limited thereto and the content may be a product advertisement content pre-stored in the display device 100 itself or the content regarding various background screens received from the external server, needless to say.

Here, the processor 150 may update the content to correspond to the current state at the time point when a user exists in the first area (e.g., date, time, location, etc.). For example, if the content is a traffic information content and if the current time is 7 A.M., the processor 150 may update the traffic information to correspond to the current time which is 7 A.M. In addition, if the content is a weather information content and the current time is 9 P.M., the processor 150 may update the weather information to correspond to the current time which is 9 P.M. Similar to this, in other various contents, the processor 150 may update the content to correspond to the current state at the time point when the user exists in the first area.

For this operation, if it is determined that the user exists in the first area, the processor 150 may request a server to transmit the content corresponding to the current state, receive the content corresponding to the current state from the server and update the content.

Specifically, if it is determined that the user exists in the first area, the processor 150 may request a server to transmit the content corresponding to the information such as time, date, etc. of the time point when the user exists in the first area, receive the content corresponding to the current time point from the server and update the content.

Thereafter, if it is determined that the user exists in the second area, the processor 150 may activate the display 140 in an inactivation state and control the display 140 to display the updated content.

For this operation, the processor 150 may continuously receive information on the distance between the user and the display device 100 from the sensor 110. According thereto, if it is determined that the user exists in the second area based on the information received from the sensor 110, the processor 150 may activate the display 140 in an inactivation state and control the display 140 to display the updated content.

Specifically, if it is determined that the user exists in the second area, the processor 150 may control to provide power to the display 140 in an off state to activate the display 140. In addition, the processor 150 may control the display 140 to display the updated content. Meanwhile, the displayed content is not limited to the updated content, and the content may be the product advertisement content pre-stored in the display device 100 itself, the content related to various background screens received from an external server, or a broadcasting program.

Meanwhile, the processor 150 may determine the distance between a user and the display device 100 in every predetermined time. Here, the predetermined time may be set by a user or by information set as a default. For example, if it is set to determine the distance between a user and the display device 100 in every 10 seconds by a user (or a manufacturer), the processor 150 may determine the distance between the user and the display device 100 in every 10 seconds.

Here, if it is determined that the user who has existed in the second area has moved to the first area, the processor 150 may control the power supplied to the display 140 to turn off the display 140.

FIG. 3 is a view illustrating a block operated in a display device based on a distance between a display device and a user according to an embodiment of the disclosure.

The display device 100 according to an embodiment of the disclosure may drive the sensor 110, the sub-processor 120 and the storage 130 if a user exists in the range exceeding the first area. That is, if the location of the user is detected only in the range exceeding the first area by the sensor 110, the display device 100 may operate in an instant on mode in which the display 140 and the processor 150 maintain an off state. In such an instant on mode, power is not applied to the display 140 and the processor 150, and thus, the display device 100 consumes minimum power.

In addition, if it is detected that the user exists in the first area by the sensor 110, the processor 150 may be activated by the sub-processor 120. According thereto, the processor 150 may update the content and ready to display the updated content through the display 140.

After then, if it is detected that the user exists in the second area by the sensor 110, the display 140 may be activated by the processor 150. According thereto, the display 140 may display the updated content.

As in the above, the display device 100 may change the configuration to be driven according to the area in which a user is detected. In accordance thereto, the booting time may be reduced compared to a cold booting that an operation system is driven by pressing an on key or a reset key of a display device.

Specifically, if a user is detected in the first area, the display device 100 may drive the processor 150 in advance. If a user is detected in the second area in a state where the processor 150 is driven in advance, the display device 100 only drives the display 140, and thus, the booting time noticed by a user, which is the time until the display panel is turned on, may be reduced compared to the booting time in the cold booting.

Figure 4:
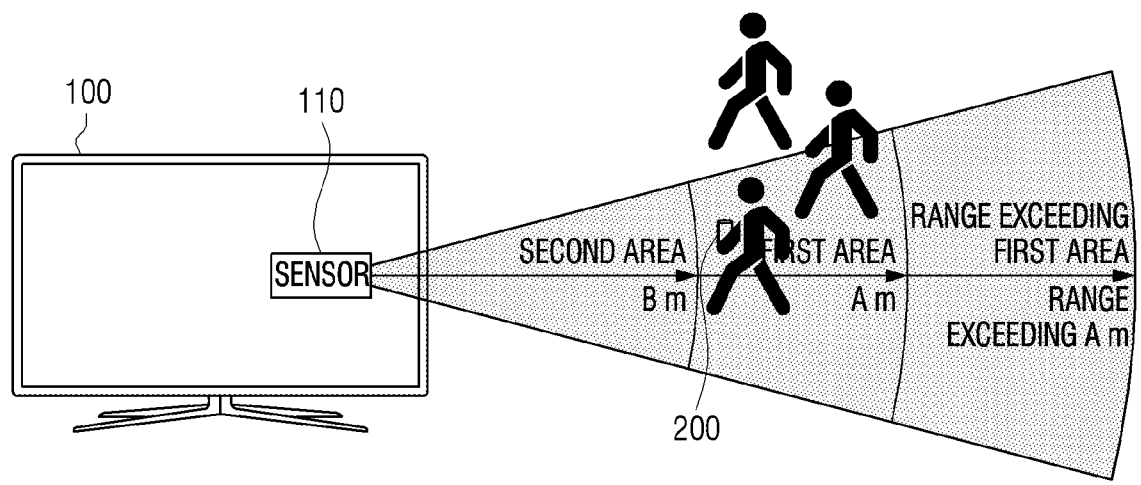
FIG. 4 is a view illustrating an operation of a display device in a case where a plurality of users exist in the first area according to an embodiment of the disclosure.

FIG. 4 is a view illustrating an operation of a display device in a case where a plurality of users exist in the first area according to an embodiment of the disclosure.

If a plurality of users exist in the first area, the processor 150 may update the content corresponding to the user of the terminal device 200 connected with the display device 100 through a network among the plurality of users.

Specifically, if a plurality of users exist in the first area, the processor 150 may determine the terminal device 200 connected to the display device 100 through a network such as Wi-Fi or Bluetooth among the plurality of users. For this operation, the display device 100 may include various communication chips such as a Wi-Fi chip, a Bluetooth chip, a wireless communication chip, a near field communication (NFC) chip, etc.

In addition, the processor 150 may update the content corresponding to the user of the terminal device 200 connected through a network. Specifically, the processor 150 may determine that the terminal device 200 connected to the display device 100 through a network as the terminal device carried by the user in the first area, and update the content corresponding to the terminal device 200 based on the information on the terminal device stored in the storage 130.

In addition, if it is determined that the user carrying the terminal device 200 exists in the second area, the processor 150 may control the display 140 to display the updated content.

In accordance thereto, if a user and unspecified persons carrying the terminal device 200 connected through a network are detected in the first area, the display device 100 according to an embodiment of the disclosure may update and display the content according to the distance between the user carrying the terminal device 200 and the display device 100, and thus, there is an effect that if the content includes personal information (e.g., a personal schedule), the display device 100 can be controlled not to expose the personal information.

Figure 5:
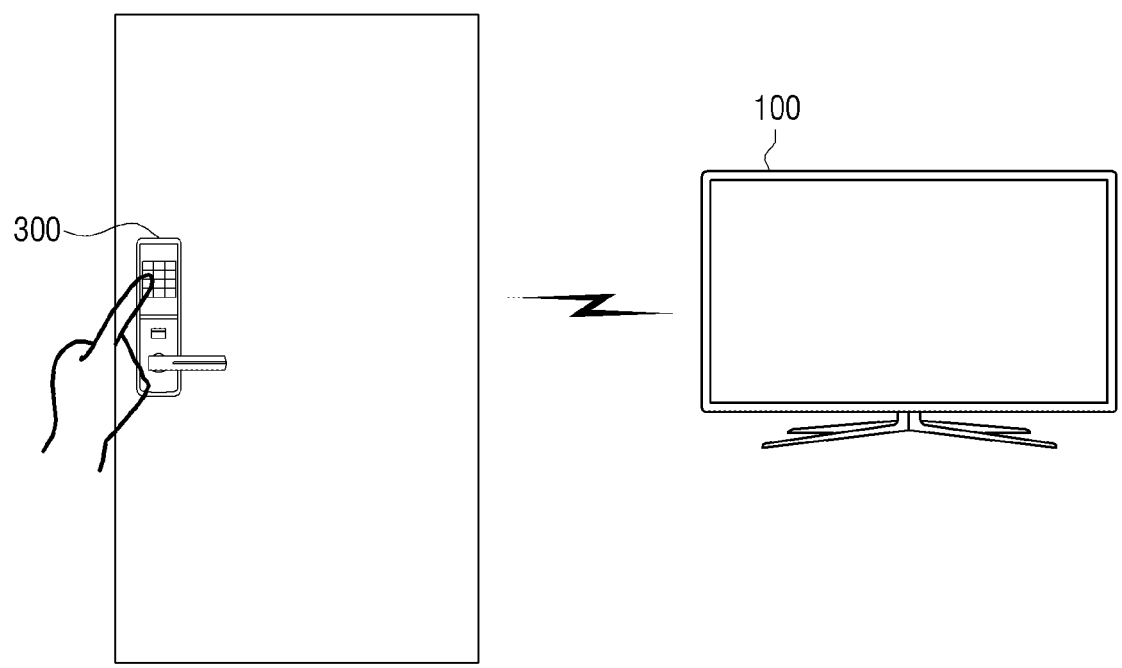
FIG. 5 is a view illustrating an operation of a display device connected with an IoT device through a network according to an embodiment of the disclosure.

FIG. 5 is a view illustrating an operation of a display device connected with an internet of things (IoT) device through a network according to an embodiment of the disclosure.

The display device 100 according to an embodiment may be connected to the IoT device through a network. For example, the IoT device may be a door lock device 300 on a front door. However, it is not limited thereto and the IoT device may be various types of electronic apparatuses such as an air conditioner, a lighting device, a computer, etc. For this operation, the display device 100 may further include a communicator (not illustrated) connected to the IoT device through a network.

In addition, if a sensing signal is received from the IoT device 300, the processor 150 may update contents. Specifically, if a user opens the door lock device 300 on the front door, the door lock device 300 may transmit the sensing signal to the IoT management server (not illustrated). In addition, if the sensing signal is transmitted through the communicator (not illustrated) of the display device by the IoT management server (not illustrated), the processor 150 may determine that the user is in the first area and update the contents.

Thereafter, if it is determined that the processor 150 exists in a predetermined area, the processor 150 may control the display 140 to display the updated content. Here, the predetermined area may be the area spaced apart from the display device 100 for more than a predetermined distance.

That is, if the display device 100 according to an embodiment is connected to the IoT device 300 through a network and operates, an operation of the IoT device 300 by a user (e.g., inputting a password to the door lock device of the front door) may be considered as the first area of FIG. 2 wherein a content is updated, and the predetermine area may be considered as the second area of FIG. 2 wherein the updated content is displayed.

According thereto, the display device according to an embodiment of the disclosure may drive the processor 150 in advance by the operation of the IoT device, for example, the operation of the door lock device 300 of a front door, and update the content, and thus, there in an effect that the user who enters the predetermined area may notice that the booting time is reduced.

Figure 6:
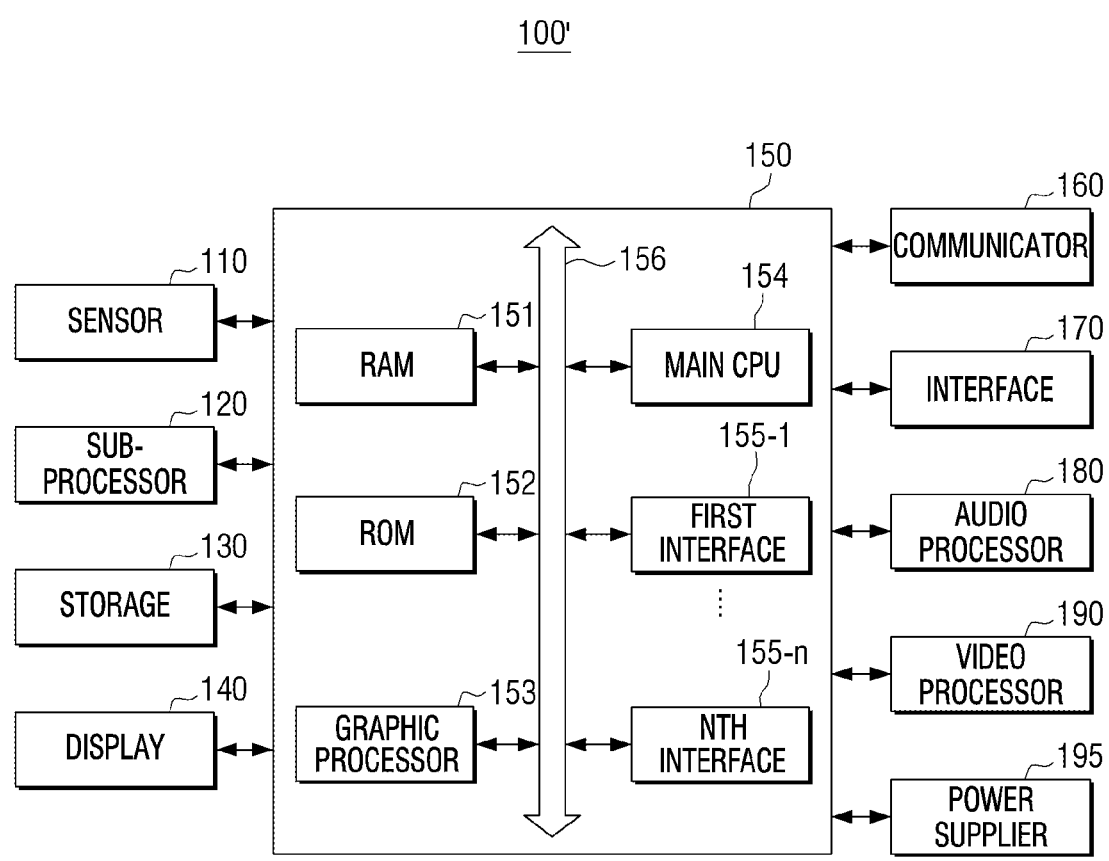
FIG. 6 is a block diagram illustrating a detailed configuration of a display device according to an embodiment of the disclosure.

FIG. 6 is a block diagram illustrating a detailed configuration of a display device according to an embodiment of the disclosure.

As shown in FIG. 6, the display device 100' according to an embodiment includes the sensor 110, the sub-processor 120, the storage 130, the display 140, the processor 150, the communicator 160, an interface 170, an audio processor 180, a video processor 190, and power supplier 195. Hereinafter explanation of the duplicate portions of FIG. 1 will be omitted.

The storage 130 may store an operating system (O/S) for controlling an overall operation of the elements of the display device 100' and command or data related to the elements of the display device 100'.

Accordingly, the processor 150 may control a plurality of hardware or software elements of the display device 100 by using diverse commands or data stored in the storage 130, load and process a command or data received from at least one of the other components in a volatile the memory, and store diverse data in a non-volatile the memory. Especially, the storage 130 may store the contents regarding weather, time, news, a personal schedule, or a traffic condition according to an embodiment.

The processor 150 controls an overall operation of the display device 100'.

Specifically, the processor 150 may include a RAM 151, a ROM 152, a graphics processor 153, a main central processing unit (CPU) 154, first through n-th interfaces 155-1-135-$n$, and a bus 156. Here, the RAM 151, the ROM 152, the graphic processing unit 153, the main CPU 154, and the first to n-th interfaces 155-1 to 155-$n$ may be connected to each other through the bus 156.

The first to n-the interfaces 155-1 to 155-$n$ are connected to the above described various configurations. One of the interfaces may be realized as a network interface connected to an external apparatus through a network.

The main CPU 134 may access the storage 110 to perform a booting sequence using an O/S stored in the storage 110. The main CPU 134 may perform various operations by using various types of programs, contents, and data, etc. stored in the storage 110.

The RAM 151 may store a command set for system booting. When a turn-on command is input and thus the power is supplied, the main CPU 154 may copy the O/S stored in the storage 130 to RAM 151 according to the instructions stored in the ROM 152, and boot the system by executing the O/S. When the booting is completed, the main CPU 154 copies various programs stored in the storage 130 to the RAM 151, and executes the programs copied in the RAM 151 to perform various operations.

The graphic processor 153 may generate a screen including various objects such as an icon, an image, a text, etc., for example, a screen including a pointing object, using a calculator (not illustrated) and a renderer (not illustrated). The calculator (not illustrated) may compute attribute values, such as coordinate values, shapes, sizes, and colors of the objects, according to a layout of the screen based on the received control command. The renderer (not illustrated) may generate a screen including the objects in various layouts based on the attribute values computed by the calculator. The screen generated by the renderer (not illustrated) is displayed in a user interface region of the display 140.

The communicator 160 may receive a broadcasting content (or a broadcasting signal). The broadcasting content may include images, audio, and additional data (for example, electronic program guides (EPG)). The communicator 160 may receive the broadcasting content from various sources such as terrestrial broadcasting, cable broadcasting, satellite broadcasting, Internet broadcasting, etc. For example, the communicator 160 may include elements such as a tuner (not illustrated), a demodulator (not illustrated), an equalizer (not illustrated), or the like, to receive a broadcasting content transmitted from a broadcasting station. In addition, the communicator 160 may be connected to the IoT device through a network and receive a sensing signal.

The interface 170 may connect various other electronic apparatuses (not illustrated) and the display device 100'. In this case, the processor 150 may transmit data which is pre-stored in the display device 100' to another electronic apparatus (not illustrated) through the interface 170, or receive data from an electronic apparatus (not shown).

For this operation, the interface 170 may include at least one of a High-Definition Multimedia Interface (HDMI) input terminal, a component input terminal, a PC input terminal, and a USB input terminal, or the like.

The audio processor 180 is an element that performs processing on audio data.

The video processor 190 is an element that performs various types of image processing, such as decoding, scaling, noise filtering, frame rate converting, resolution converting, etc., with respect to a content.

The power supplier 195 supplies power to the detailed configuration of the display device 100'.

Specifically, the power supplier 195 may supply power to the sensor 110 and the sub-processor 120 in the range exceeding the first area described above without supplying power to the processor 150 and the display 140. Meanwhile, the power may be supplied to other elements which is required to be driven to operate the sensor 110 and the sub-processor 120. According thereto, in a state where the processor 150 and the display 140 are inactivated (or turned off), the sensor 110 may continuously detect the distance between a user and the display device 100 and the sub-processor 120 may receive a detection signal generated from the sensor 110.

In addition, the power supplier 195 may supply power to the processor 150 if a user is detected in the above first area. Meanwhile, the power may be supplied to other configurations which require to be driven for the operation of the processor 150, needless to say. According thereto, the processor 150 is activated and if it is determined that a user exists in the first area by determining the distance between the user and the display device 100, a content may be updated. However, the power supplier 195 may does not supply power to the display 140 as in the case where a user is detected in the range exceeding the first area, and thus the display may maintain the off state.

In addition, the power supplier 195 may supply power to the display 140 if a user is detected in the above described second area. In accordance thereto, the display 140 may display the updated content, a broadcasting content, etc.

Figure 7:
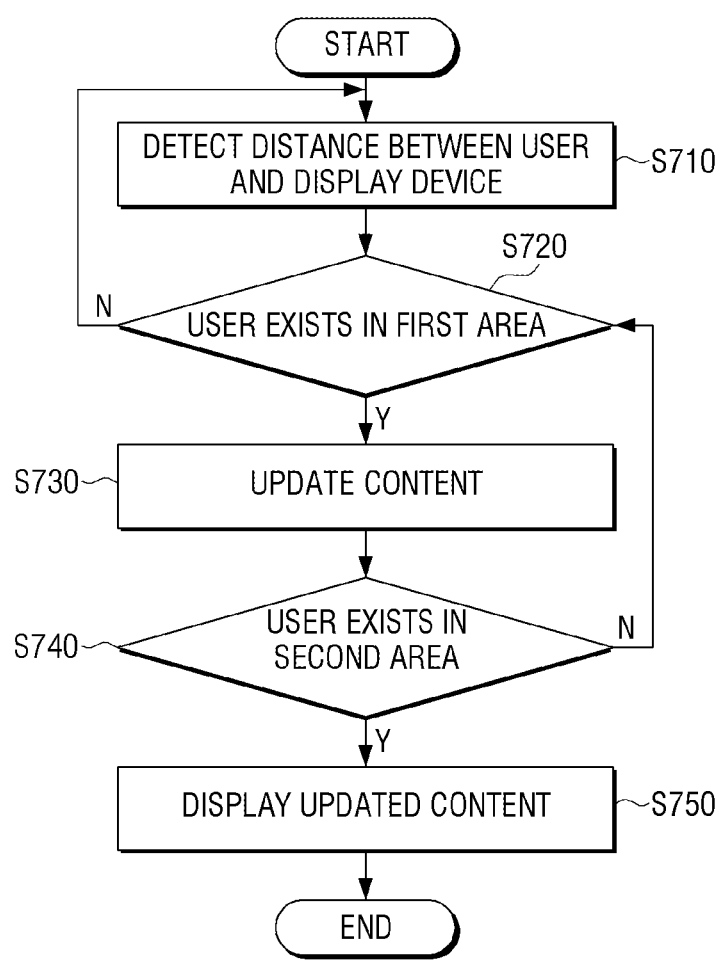
FIG. 7 is a flow chart illustrating a method for controlling a display device according to an embodiment of the disclosure.

FIG. 7 is a flow chart illustrating a method for controlling a display device according to an embodiment of the disclosure.

Frist, the display device may detect the distance between a user and the display device in S710.

In addition, the display device may determine whether the user exists in the first area in S720. Here, if it is determined that the user does not exist in the first area, the display device may detect the distance between the user and the display device again and if it is determined that the user exists in the first area, the display device may update a content in S730.

In addition, it is determined whether the user exists in the second area in S740. For this operation, the display device may continuously detect the distance between the user and the display device. Here, if it is determined that the user does not exist in the second area, the above process is repeated by determining whether the user exists in the first area, and if it is determined that the user exists in the second area, the updated content is displayed in S750.

Meanwhile, the methods according to the above-described various embodiments of the disclosure may be realized by upgrading the software or hardware of the existing display device.

The above-described various example embodiments may be executed through an embedded server included in the display device or through an external server outside the display device.

The controlling method of the display device according to various embodiments described above may be implemented as a program and stored in various recording media. In other words, a computer program which is processed by various processors to execute the above-described various controlling methods may be stored and used in a recording medium.

For example, a non-transitory computer readable medium storing the program performing receiving the distance between a user and a display device, updating a content if a user exists in the first area, and displaying an updated content if a user exists in the second area may be provided.

The non-transitory computer readable medium is not a medium that stores data for a short moment such as a register, a cash and a memory and the like, but a medium that stores data semi-permanently and which is readable by an apparatus. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

Although various embodiments of the disclosure have been illustrated and described hereinabove, the disclosure is not limited to the above-mentioned embodiments, but may be variously modified by those skilled in the art to which the disclosure pertains without departing from the scope and spirit of the disclosure as set forth in the accompanying claims. These modifications should also be understood to fall within the scope of the disclosure.

What is claimed is:

1. A display device comprising:
    a display,
    a storage configured to store a content corresponding to a user,
    a sub-processor configured to receive, from a sensor, a first detection signal indicative of the user in a first area among a plurality of areas divided according to a distance from the display device; and
    a processor configured to, based on the sub-processor receiving, from the sensor, the first detection signal indicative of the user in the first area during a time period that the display is in an inactivated state, automatically perform the following operations:
        become activated by the sub-processor,
        upon becoming activated, obtain the content corresponding to the user from the storage,
        request a server to transmit information on the obtained content that is generated based on a time point at which the processor became activated,
        receive the information from the server, and
        update the obtained content based on the received information,
    wherein the processor is further configured to, based on receiving, from the sensor, a second detection signal indicative of the user in a second area closer to the display device than the first area, among the plurality of areas, activate the display from the inactivated state and control to display the updated content through the activated display.

2. The display device as claimed in claim 1, wherein the processor is further configured to:
    based on the first detection signal indicative of a plurality of users existing in the first area, identify a terminal device connected to the display device through a network,
    identify a user corresponding to the terminal device,
    obtain the content corresponding to the user of the terminal device among the plurality of users from the storage, and
    update the obtained content corresponding to the user of the terminal device.

3. The display device as claimed in claim 1, wherein the display device further comprises a communicator configured to be connected to an Internet of Things (IoT) device through a network,
 wherein the processor is further configured to, in response to a signal being received from the IOT device, automatically perform the following operations:
  become activated,
  obtain the content corresponding to the user from the storage,
  receive the information from the server, and
  update the obtained content based on the received information.

4. The display device as claimed in claim 1, wherein the content comprises at least one of a weather, a time, news, a personal schedule, or a traffic condition.

5. A method for controlling a display device, the method comprising:
 storing, in a storage, a content corresponding to a user;
 receiving, from a sensor, a first detection signal indicative of the user in a first area among a plurality of areas divided according to a distance from the display device;
 based on receiving the first detection signal during a time period that a display of the display device is in an inactivated state, automatically performing the following operations:
  activating a processor of the display device,
  obtaining the content corresponding to the user,
  requesting a server to transmit information on the obtained content that is generated based on a time point at which the processor became activated,
  receiving the information from the server, and
  updating the obtained content based on the received information;
 wherein the method further comprises:
  receiving, from the sensor, a second detection signal indicative of the user in a second area closer to the display device than the first area, among the plurality of areas, and
  based on the receiving the second detection signal, the display from the inactivated state and displaying the updated content through the activated display.

6. The method as claimed in claim 5, wherein the updating the content further comprises:
 based on the first signal indicative of a plurality of users existing in the first area, identifying a terminal device connected to the display device through a network;
 identifying a user corresponding to the terminal device;
 retrieving the content corresponding to the user of the terminal device among the plurality of users; and
 updating the obtained content corresponding to the user of the terminal device.

7. The method as claimed in claim 5, wherein, the method further comprises:
 connecting to an Internet of Things (IoT) device through a network; and
 in response to a signal being received from the IoT device, automatically performing the following operations:
  retrieving the content corresponding to the user from the storage,
  receiving the information from the server, and
  updating the obtained content based on the received information.

8. The method as claimed in claim 5, wherein the content comprises at least one of a weather, a time, news, a personal schedule, or a traffic condition.

9. The display device as claimed in claim 1, wherein, in the updating the obtained content, the processor is further configured to update an older version of content based on the received information.

\* \* \* \* \*